June 24, 1958  J. F. MILLER  2,840,789
ARC WELDING APPARATUS
Filed June 19, 1953  2 Sheets-Sheet 1

INVENTOR
Joseph F. Miller.
BY Hymen Diamond
ATTORNEY

June 24, 1958     J. F. MILLER     2,840,789
ARC WELDING APPARATUS

Filed June 19, 1953     2 Sheets-Sheet 2

United States Patent Office 2,840,789
Patented June 24, 1958

2,840,789

ARC WELDING APPARATUS

Joseph F. Miller, Buffalo, N. Y., assignor to Westinghouse Electric Corporation, East Pittsburgh, Pa., a corporation of Pennsylvania Application June 19, 1953, Serial No. 362,845

4 Claims. (Cl. 336—134)

My invention relates to converting apparatus and has particular relation to arc welders. The subject matter to which this application is directed is disclosed but not claimed in an application Serial No. 357,321, filed May 25, 1953, to Emil F. Steinert, Harry J. Bichsel and Ray Verne Lester, and assigned to Westinghouse Electric Corporation (hereinafter called the Steinert application).

The Steinert application relates to the general class of arc welding apparatus in the operation of which the welding current is set by properly adjusting a variable reluctance core assembly. This assembly includes a fixed core and a movable core, the position of the movable core with respect to the fixed core being set to determine the air gap between the fixed core and the movable core and thus the reluctance of the core assembly.

In arc welding apparatus constructed and operated in accordance with the teachings of the prior art of which I am aware, the movable core of the variable reluctance core assembly is supported from certain parts of the container in which the apparatus is mounted. Such apparatus while in use during a welding operation vibrates violently. The vibrations reduce the life of the apparatus and produce a disagreeable loud noise, causes discomfort and may be seriously injurious to operating personnel.

It is accordingly broadly an object of my invention to provide arc welding apparatus including a variable reluctance core assembly which shall operate without excessive vibration and noise.

My invention in its broder aspects arises from the realization that the violent vibration and the noise of the prior art welders is caused by the periodic forces exerted on its mounting by the variable reluctance core assembly as it is subjected to the periodically varying load current. The variable reluctance core of prior art apparatus is the core assembly of the reactor of this apparatus. The windings of this reactor carry alternating current, and as the assembly is excited by this alternating current, the legs of the movable and fixed cores of the assembly change in magnetic polarity in synchronism with the alternating-current flowing through the windings. Forces varying in frequency with the alternating current are thus exerted between the fixed core and the movable core and the movable core is actuated by these forces. Since the exciting currents are relatively large, the forces are large and the movable core vibrates with a large amplitude moving its support with it.

It is accordingly a specific object of my invention to provide a variable reluctance core assembly for an arc welder in which the vibrations of the movable core shall be suppressed.

Another specific object of my invention is to provide a mounting for the movable core of a variable reluctance core assembly of such character that the vibrations of the movable core shall be minimized to a point where excessive noise by reason of vibrations shall be suppressed.

In accordance with the broad aspects of my invention, the movable core of the variable reluctance core assembly of an arc welder is suspended from at least one threaded shaft which engages an internally threaded opening in a bar secured to the movable core and is supported by a thrust bearing secured to the fixed core. By rotating the shaft, the movable core may be moved towards, or retracted from, the fixed core and thus the air gap of the variable reluctance core assembly may be varied. The tendency of the movable core to vibrate is suppressed at the junction of the threads and by the thrust bearing.

In accordance with the specific aspects of my invention, the movable core of the variable reluctance core assembly is suspended from a pair of symmetrically disposed threaded shafts which engage threaded openings in a bar secured to the assembly. Each of the shafts is provided with a shoulder and passes through an opening in a thrust bearing bar secured to the fixed core, the shoulder engaging the boundary of the latter opening and affording the necessary thrust bearing support. The ends of the shaft extend beyond the fixed core and each carries a sprocket wheel. The sprocket wheels are coupled by means of a sprocket chain and when one of the shafts is rotated to move the movable core in one direction or the other, the other shaft rotates with it and moves the core in the same direction. The movable core is thus symmetrically suspended and moved parallel to itself and has no tendency to become set at an angle to its initial position and to stick.

The novel features that I consider characteristic of my invention are set forth generally above. The invention itself, however, both as to its organization and its method of operation, together with additional objects and advantages thereof may be understood from the following description of a specific embodiment when read in connection with the accompanying drawings, in which:

Fig. 4 is a view in section of a portion of the fixed core assembly showing the thrust bearing means.

Figure 1:
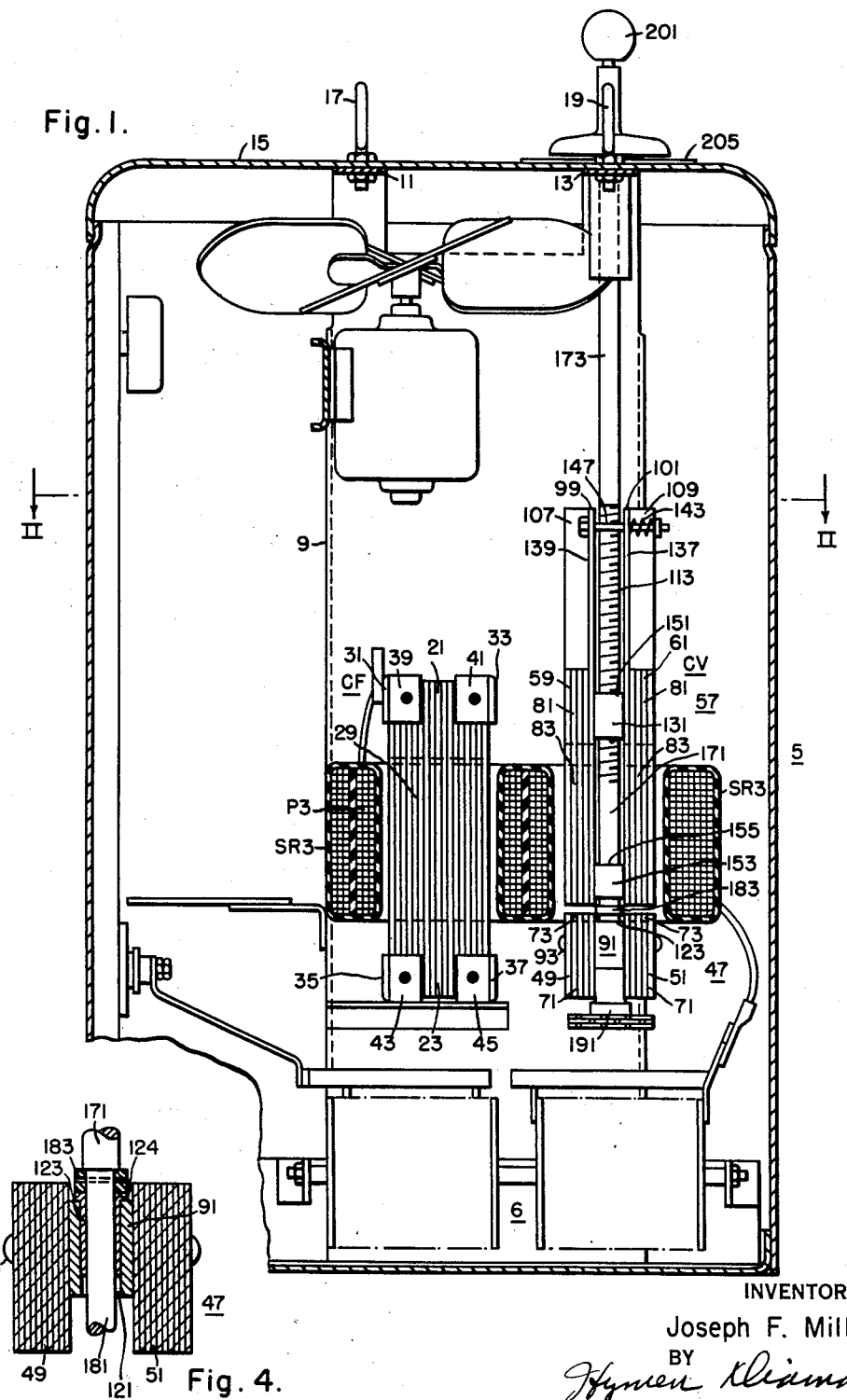
Figure 1 is a view, partly in side elevation and partly in transverse section, of apparatus in accordance with my invention, with one side of the housing of the apparatus removed to show the interior and with certain parts broken away to show detail.
Figure 2:
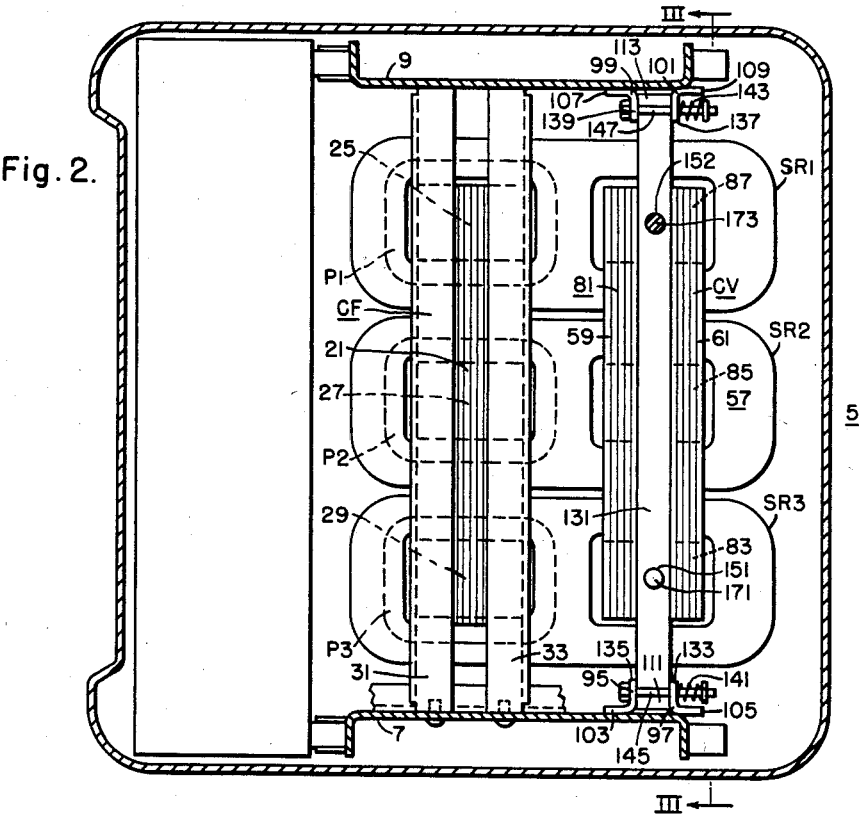
Fig. 2 is a view in section, taken along line II—II of Fig. 1.

My invention concerns itself principally with the variable reluctance core assembly of the arc welding apparatus disclosed in the Steinert application. But, to facilitate the understanding of the invention, my invention will be explained as a part of the apparatus disclosed in the Steinert application. It is to be understood that my invention can be used with other apparatus, and in other ways and in other embodiments, than that disclosed in the Steinert application and such other uses are within the scope of this application and any patents which may issue thereon.

The apparatus shown in the drawings includes a container 5 within which fixed and variable reluctance core assemblies CF and CV respectively with their associated primary and secondary-reactor windings P1, P2, P3 and SR1, SR2, SR3 respectively are mounted. The windings P1, P2, P3 are connected to power supply buses (not shown) and the windings SR1, SR2, SR3 to a rectifier assembly 6 in the manner described in the Steinert application. The core assemblies CF and CV and their windings are supported on a pair of channels 7 and 9, each channel having ears 11 and 13 at the top and bottom (not shown for 7 or at the bottom). The channels are secured by the ears 11 and 13 at the top to the cap 15 of the container 5 by means of eye-bolts 17 and 19 which may be used to lift the assembly out of the container 5. The channels 7 and 9 are similarly supported from the base of the container but this support is not shown in detail.

The fixed core assembly CV comprises a laminated closed core consisting of upper and lower cross laminations 21 and 23 between which a plurality of legs 25, 27 and 29 extend. The laminations are held together by elongated angle brackets 31, 33, 35 and 37 at the corners of the cross laminations, which brackets are provided with flaps 39, 41, 43, 45 at their ends and are secured by these flaps to the channels 7 and 9 (flaps at rear not shown).

The variable reluctance core assembly comprises a fixed core 47 made up of two parallel sections 49 and 51 of similar (congruent) longitudinal cross section and a movable core 57 also made up of two parallel sections 59 and 61 of similar (congruent) longitudinal cross section. The fixed and movable cores are both laminated. Each section 49 and 51 of the fixed core 47 consists of cross laminations 71 from which a plurality of legs 73, 75, 77, preferably stub legs, extend. Each section 59 and 61 of the movable core 57 consists of cross laminations 81 from which legs 83, 85, 87 of substantial length extend. The dimensions of the fixed and movable core sections 49 and 51 and 59 and 61 are such that when the movable sections are disposed opposite the fixed sections, the ends of the legs 83, 85, 87 of the movable sections are disposed directly opposite the ends of the legs 73, 75, 77 of the fixed section.

The fixed sections 59 and 61 are combined into a rigid fixed core by means of a metallic bar 91 which is parallel to the length of the cross lamination 71 extends between the sections along the legs 73, 75 and 77 and is secured to them by bolts 93. This bar 91 extends beyond the fixed core 47 on each side and is secured by bolts 92 to the sides 133 and 135 and 137 and 139 of a guide formed between elongated angles 95, 97, 99 and 101. One side 103 and 107 of the angles 95 and 99 is welded near one end of each of the channels 7 and 9 respectively. The sides 133 and 137 of the angles 97 and 101 are bolted by the bolts 92 to the sides 135 and 139 respectively of the welded angles. The angles 95 through 101 extend vertically along the channels and form a groove 111 and 113 between them. The bar 91 secured to the fixed core sections 49, 51 is rigidly secured to the angles 95, 97, 99, 101 and the fixed core 47 is thus supported from the channels 7 and 9 by means of the angles.

Openings 121 and one (not shown) to the rear with respect to Fig. 1 are provided in the bar 91. These openings are preferably spaced centrally between the end legs 73 and 77 of the sections 49 and 51 and are provided with bushings 123 (Fig. 4) each of which has a flange 124 which extends over the top of the opening and serves as a thrust bearing.

The sections 59 and 61 of the movable core are also held together by a metallic bar 131 which is secured to the sections at the cross laminations 81. The bar 131 extends along the length of the cross laminations 81 and beyond the sections of the movable core 57 on each side. At each end, this bar engages the guide or grooves 111 and 113 formed between the angles 95 and 97 and 99 and 101 to which the bar 91 is secured. To assure firm engagement between the ends of the bar 131 which is secured to the movable core 57 and the angle guides 111 and 113, the sides 133 and 135 and 137 and 139 of the angles which define the guides 111 and 113 are at the end near the bar 131 urged towards each other by springs 141 and 143 which are mounted on bolts 145 and 147 near the top of each guide and which urge the sides 133 and 137 of the angles towards the side 135 and 139 of the other. If necessary the angles 97 and 101 may also be vertically supported by pins or rivets which extend from the channels 7 and 9 through slots in the sides 105 and 109 permitting lateral movement of the angles 97 and 101 under the action of the springs 141 and 143.

The bar 131 which holds together the movable core sections 59 and 61 is provided with internally threaded openings 151 and 152. The openings are located centrally with respect to the end legs 83 and 87 of each of the sections 59 and 61 and are thus aligned with the openings 121 in the bar which secures the fixed core sections 49 and 51 together.

Insulating spacers 153 and one (not shown) to the rear with respect to Fig. 1 are provided between the tips of the end legs 83 and 87 of each of the sections of the movable core 57. These spacers have openings which are aligned with the internally threaded openings 151 and 152 and the openings 121 in the bar, which secure the fixed core sections 49 and 51 together.

A threaded shaft extends through each of the sets 121—151—153; 121—152—153 of aligned openings engaging the thread in the internally threaded opening 151 and 152. Each shaft is attenuated near the openings 121 and the attenuated portions 181 and one (not shown) to the rear with respect to Fig. 4 extend through the bearings 123 to a point beyond the fixed core at the lower end. A collar 183 and one (not shown) to the rear of Figs. 1 and 4 is pinned to each shaft 171 and 173 in the region where the attenuated section 181 starts. This collar engages the flange 124 of the bushing 123 so that the flange serves as a thrust bearing. To the end of each shaft 171 and 173 a sprocket wheel assembly 191 and 193 is secured. A sprocket chain 195 extends between and engages the sprocket wheels.

Figure 3:
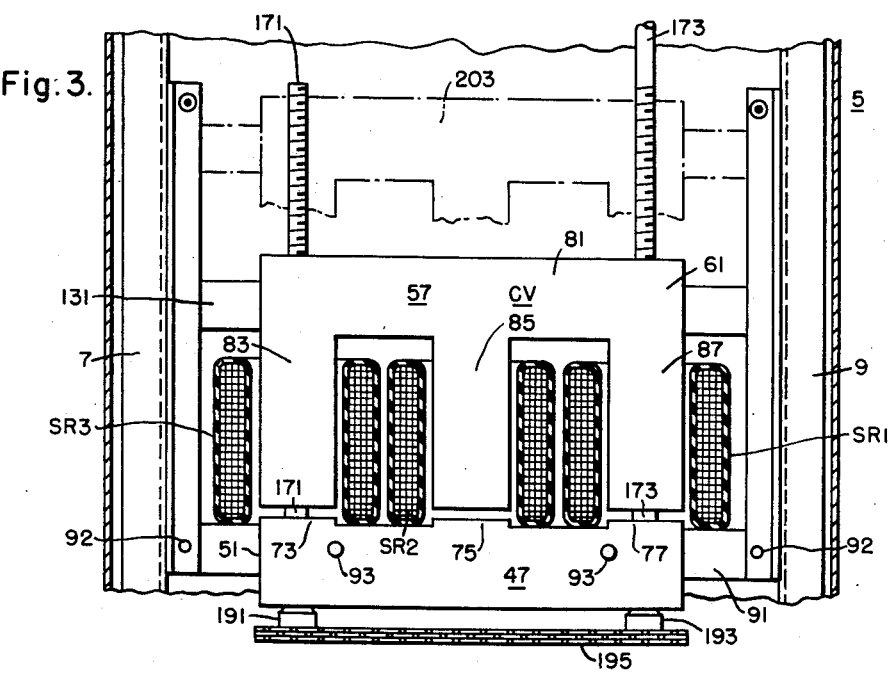
Fig. 3 is a view in section, taken along line III—III of Fig. 2.

One of the shafts 173 passes through the cap 15 of the container 5 and engages a crank 201 by means of which it may be rotated. The other shaft 171 extends only to a point a short distance above the highest position (203 Fig. 3) to which it is desired that the movable core 57 be raised. An indicating dial 205 for indicating the angular position of the shaft is provided at the top of the container. This dial is coupled to the shaft 173 which is rotated by means of the crank 201 through a reducing gear train (not shown). The movable core 57 may be moved upward and downward with the legs 83, 85, 87 passing through the windings SR3, SR2, SR1 respectively by which they are encircled by rotation of the crank 201.

The movable core 57 is firmly suspended from the shafts 171 aand 173. The shafts themselves are supported firmly by the thrust bearing 124. Any tendency of the movable core 57 to vibrate is suppressed by the firm support of this core by means of the shaft and the thrust bearing and is further reduced by the sides 133 and 135 and 137 and 139 of the guiding grooves 111 and 113 in which the bar 13 slides.

While I have shown and described a certain specific embodiment of my invention, many modifications thereof are possible. My invention, therefore, is not to be limited except insofar as is necessitated by the prior art.

I claim as my invention:

1. A variable reluctance core assembly including a fixed core having leg means and a movable core having leg means to be disposed adjacent said fixed leg means characterized by means for supporting said movable core with the end of said leg means thereof adjacent the end of said leg means of said fixed core, the last said means comprising a supporting member having at least two internally threaded openings extending parallel to said leg means and symmetrically disposed in the cross sectional planes of said core, which planes are perpendicular to said leg means, at least two threaded shafts each passing through an internal threaded opening with the thread on said shaft engaging the internal thread of the opening, each said shaft having a shoulder in the portion thereof beyond the end of said leg means of said movable core, at least two thrust bearing means secured in said fixed core, each in alignment with a threaded opening, said thrust bearing means having openings through which its corresponding shaft passes, said shoulder on each said shaft engaging the boundary of its corresponding openings, means for driving one of said shafts, and means coupling the said other shaft to said one shaft near the ends of said shafts on the opposite side of said last-named openings from said driving means for driving said other shaft from said one shaft.

2. A variable reluctance core assembly comprising a three-legged fixed core, a three-legged movable core, a first bar secured to said fixed core along the legs thereof and perpendicular to said legs, openings in said bar centrally disposed with respect to the end legs of said fixed core, a second bar secured to said movable core along the legs thereof and perpendicular to said last-named legs, internally threaded openings in said last-named bar centrally disposed with respect to the legs thereof, a threaded shaft extending through each of said threaded opening and a corresponding opening in said first bar, the thread of said shaft engaging the internal thread of said threaded opening through which it extends, each said shaft having a soulder which engages and rests on the boundary of the opening in said first bar through which it extends and each shaft extending beyond said fixed core, a sprocket wheel on the end of each shaft on the opposite side of said openings in said first bar from said shoulder, and a sprocket chain interconnecting said wheels.

3. A variable reluctance core assembly comprising a three-legged fixed core, a three-legged movable core, a first bar secured to said fixed core along the legs thereof and perpendicular to said legs, openings in said bar centrally disposed with respect to the end legs of said fixed core, a second bar secured to said movable core along the legs thereof and perpendicular to said last-named legs, said second bar extending beyond said movable core on each side, guiding means cooperative with the extending ends of said second bar for guiding the movement of said movable core, internally threaded openings in said last-named bar centrally disposed with respect to the legs thereof, a threaded shaft extending through each of said threaded openings and a corresponding opening in said first bar, the thread of said shaft engaging the internal thread of said threaded opening through which it extends, each said shaft having a shoulder which engages and rests on the boundary of the opening in said first bar through which it extends and each shaft extending beyond said fixed core, a sprocket wheel on the end of each shaft on the opposite side of said openings in said first bar from said shoulder, and a sprocket chain interconnecting said wheels.

4. A variable reluctance core assembly comprising a three-legged fixed core, a three-legged movable core, each said cores being comprised of two similar parallel three-legged sections, a first bar extending between and secured to said sections of said fixed core along the legs thereof and perpendicular to said legs, openings in said bar centrally disposed with respect to the end legs of said fixed core, a second bar extending between and secured to said sections of said movable core along the legs thereof and perpendicular to said last-named legs, internally threaded openings in said last-named bar centrally disposed with respect to the legs thereof, a threaded shaft extending through each of said threaded openings and a corresponding opening in said first bar, the thread of said shaft engaging the internal thread of said threaded opening through which it extends, each said shaft having a shoulder which engages and rests on the boundary of the opening in said first bar through which it extends and each shaft extending beyond said fixed core, a sprocket wheel on the end of each shaft on the opposite side of said openings in said first bar from said shoulder, and a sprocket chain interconnecting said wheels.

References Cited in the file of this patent

UNITED STATES PATENTS

| | | |
|---|---|---|
| 2,342,764 | Steinert | Feb. 29, 1944 |
| 2,437,021 | Fries | Mar. 2, 1948 |
| 2,567,617 | Pedersen | Sept. 11, 1951 |

FOREIGN PATENTS

| | | |
|---|---|---|
| 283,678 | Italy | Mar. 18, 1931 |
| 550,696 | Great Britain | Jan. 20, 1943 |